United States Patent Office 3,605,797
Patented Sept. 20, 1971

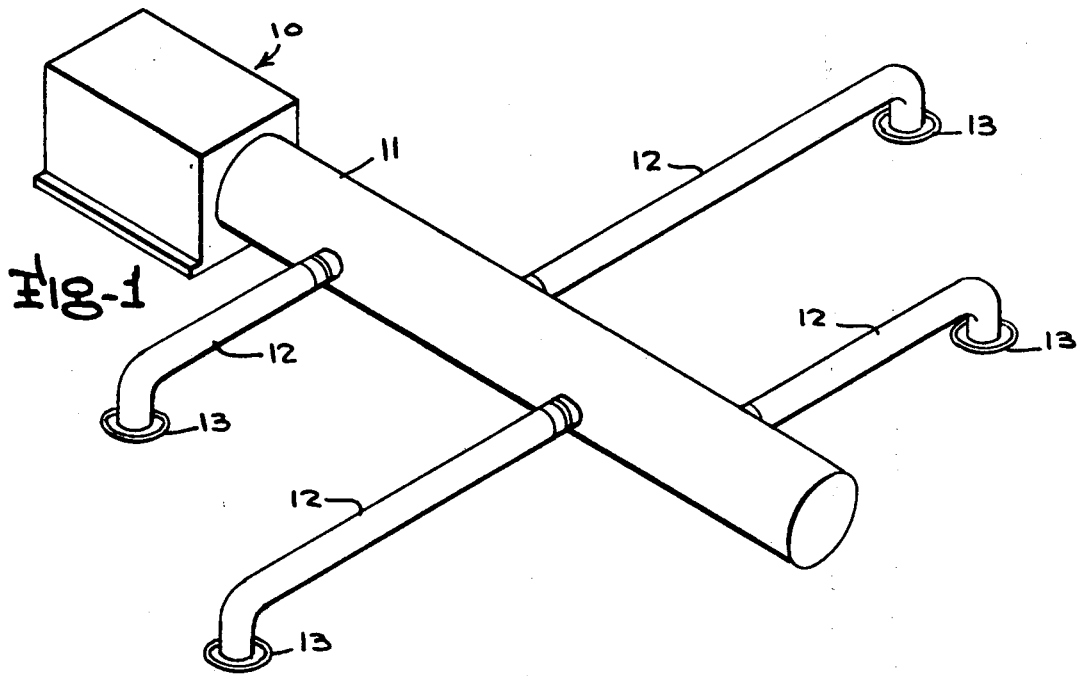
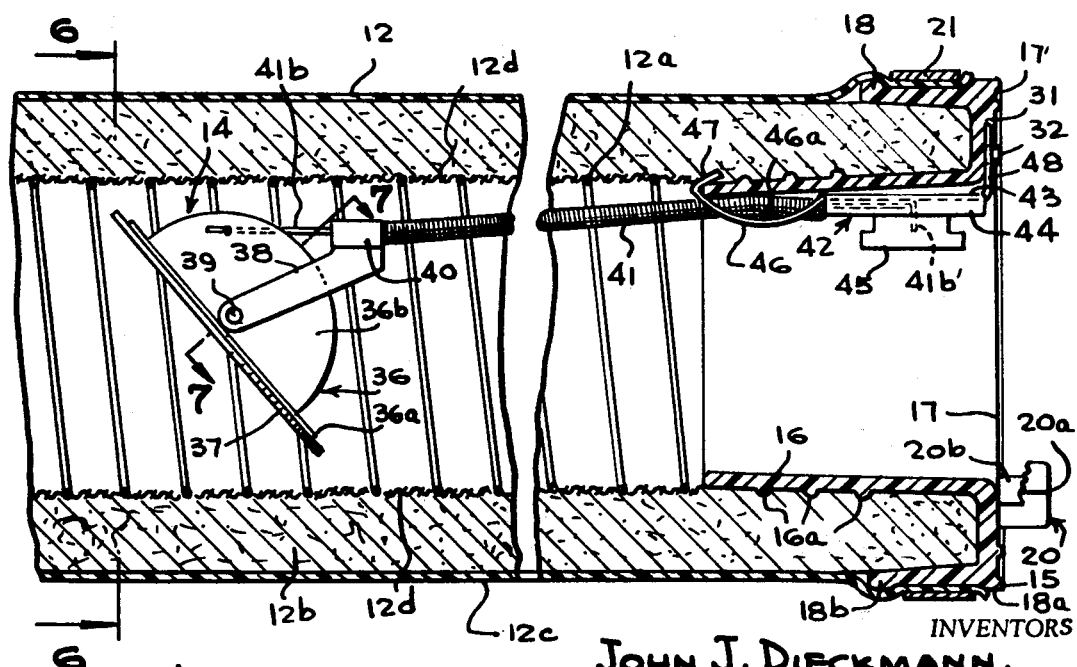

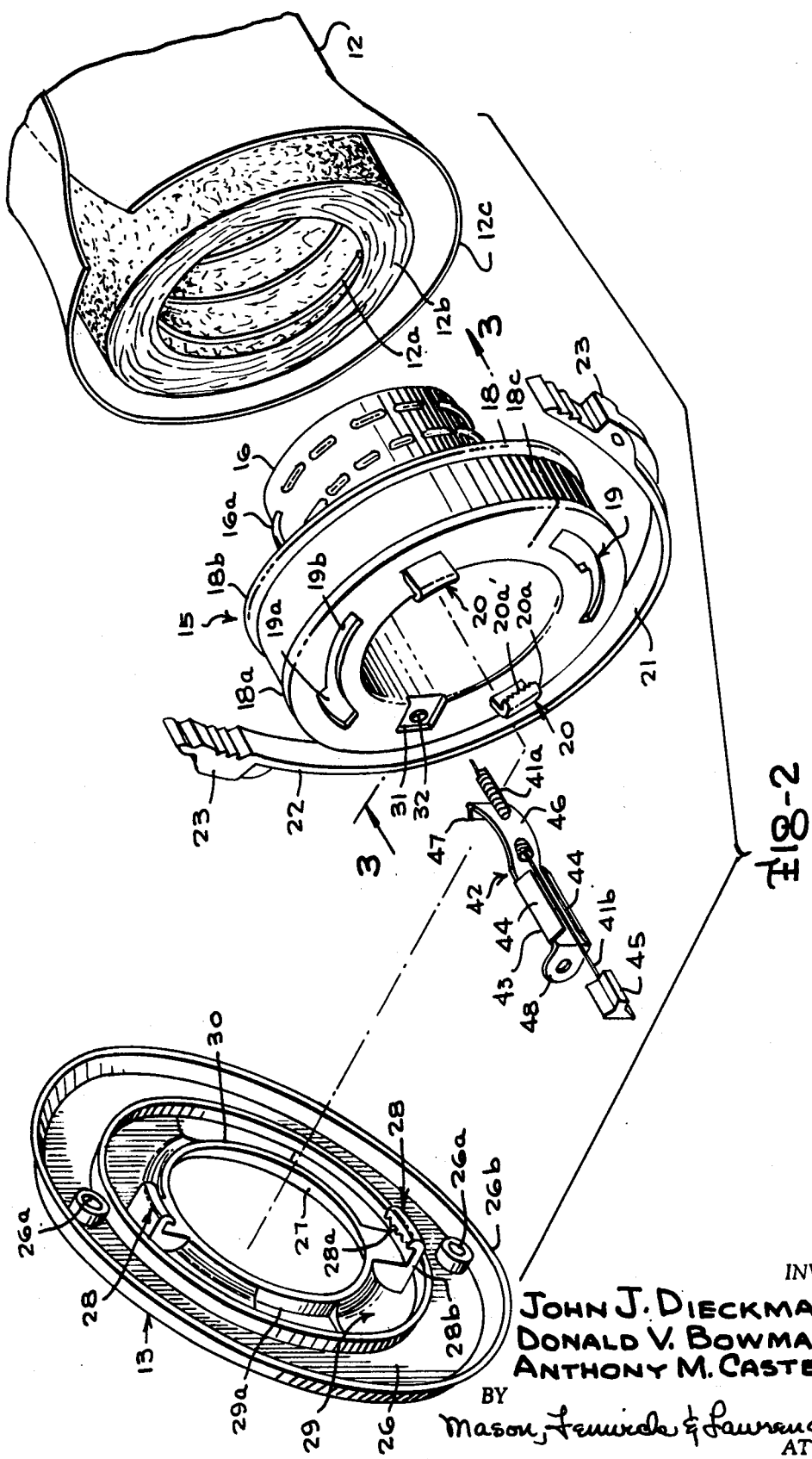

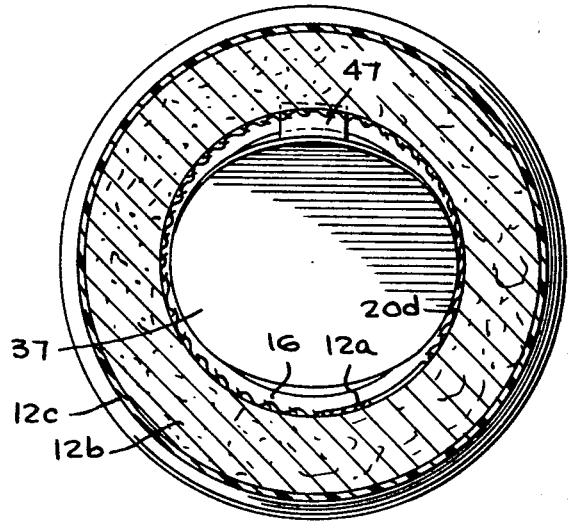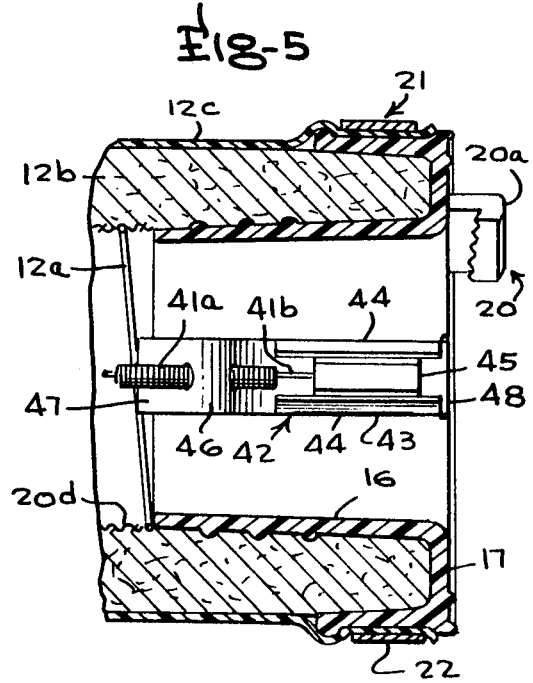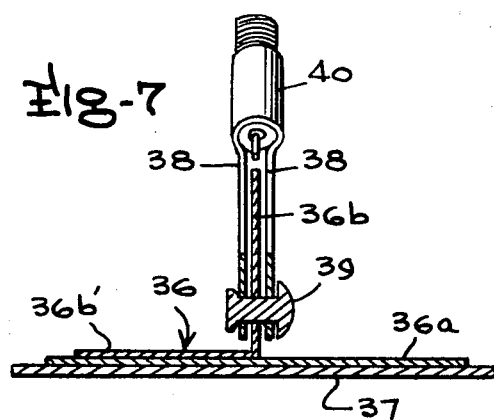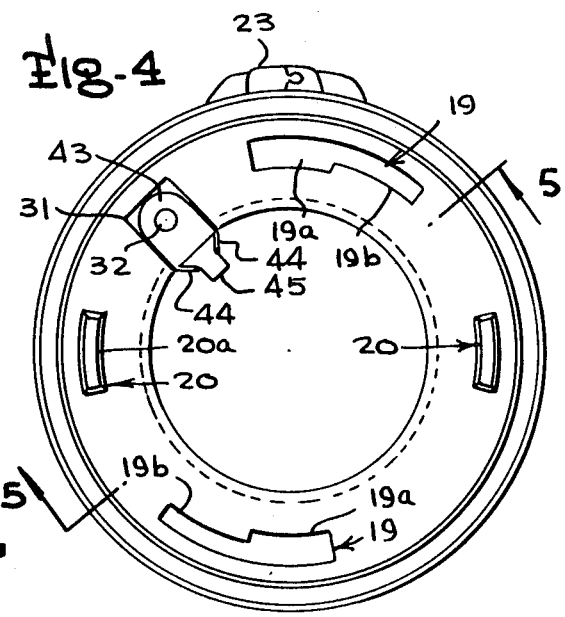

3,605,797
SHUT OFF DAMPER ASSEMBLY FOR HIGH
VELOCITY DUCTED AIR TYPE CONDITION-
ING SYSTEM
John J. Dieckmann, Harrisonburg, Donald V. Bowman,
Dayton, and Anthony M. Castello, Harrisonburg, Va.,
assignors to Dunham-Bush, Inc., West Hartford, Conn.
Filed May 18, 1970, Ser. No. 38,072
Int. Cl. F16k 27/00, 1/22; F24f 13/06
U.S. Cl. 137—375       15 Claims

ABSTRACT OF THE DISCLOSURE

A shut off damper assembly which can be installed as a unit in an already installed sound attenuating flexible air tube for high velocity conditioned air. The air tube has a quick connector at its downstream end for connection to an orifice device and the damper assembly includes a pivoted damper to be inserted in the air tube to occupy a location spaced upstream from the connector and a clip member to be detachably mounted on the connector and support a Bowden cable sheath and a slide member for actuating the Bowden cable wire attached to the damper to control its angular position.

BACKGROUND AND OBJECTS OF THE INVENTION

The present invention relates to a high velocity ducted air type conditioning system wherein an air handling branch duct is coupled at one end to a larger cylindrical duct forming a main trunk plenum and the other end is coupled to a terminator outlet by which a high velocity air stream is discharged into the room to be conditioned, and particularly to a shut off damper assembly for use in the branch conduits of such systems.

Heretofore, a high velocity ducted air type conditioning system has been developed to provide heating and/or cooling of spaces to be conditioned by conveying high velocity conditioned air to such spaces from a heating and cooling generator first to an elongated larger diameter cylindrical main trunk duct, for example having an inner diameter of about 7 inches, forming a plenum. A plurality of smaller diameter branch ducts, for example of about 2 inches inner diameter, suitable to fit within conventional stud building walls, extend from the trunk duct to the ceiling, wall or floor of each of the rooms to be served, where an outlet fitting in the form of an annular terminator device is provided. This system is designed to discharge the high velocity conditioned air into the room in a concentrated air stream at sufficient velocity to induce an air circulation pattern in a room solely by the concentrated air stream which effectively mixes conditioned air with the air in the room to achieve substantially uniform temperature. An example of such a system is disclosed in earlier patent application Ser. No. 866,052, entitled Heating and Cooling System, filed by John J. Dieckmann, one of the co-inventors named in the present application. To facilitate installation and repair of the ducting system in such a high velocity air conditioning system, an assembly has been disclosed in later patent application Ser. No. 874,472, filed by the co-inventors of the present application, wherein quick connect attachment devices include a coupling member are provided at each of the opposite ends of each insulated flexible high velocity air tube forming each branch duct, to be connected to a mating coupling member connectable at one end to a large cylindrical encased insulated duct forming the plenum or main trunk duct, and at the other end to a terminator outlet plate forming a smooth unobstructed round opening at the opposite or discharge end of the branch duct for discharge of the concentrated conditioned air stream into the room.

It has been found that in certain installations, the need exists to provide a means for shutting off or reducing air flow from the simple unencumbered outlet forming the terminator device disclosed in the systems of said above mentioned patent applications. Any attempt to provide a shut off damper in the immediate vicinity of the outlet or terminator device creates considerable noise and is unacceptable to the home owner.

An object of the present invention is the provision of a shut off damper assembly that can be easily installed into existing terminator outlets or be assembled at the time of installation, and which is located in such a position as to avoid production of an unacceptable noise level.

Another object of the present invention is the provision of a shut off damper assembly for installation near the discharge or outlet end of branch ducts of high velocity ducted air type conditioning systems, wherein the assembly can be easily installed through a quick connect coupling member adjacent the terminator discharge orifice, and wherein simple means is provided for actuating the shut off damper through the orifice without acoustically detrimental projection into the air stream or unsightly projection into the room.

Another object of the present invention is the provision of a novel shut off damper assembly as described in the immediately preceding paragraph, wherein the damper may be adjusted to any position from full open to full closed without creating any significant increase in noise level in the room.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a somewhat diagrammatic perspective view illustrating a high velocity ducted air type heating system with which the shut off damper assembly of the present invention is concerned;

FIG. 2 is an exploded perspective view of the discharge or outlet end portion of a high velocity branch duct and the quick connect coupling member and terminator outlet device with which the shut off damper assembly is employed;

FIG. 3 is a longitudinal section view of the downstream end portion of the branch duct and coupling member taken along the line 3—3 of FIG. 2, and illustrating in side elevation in association therewith the shut off damper assembly constructed in accordance with the present invention;

FIG. 4 is an end elevation view of the quick connect coupling device and shut off damper assembly associated therewith;

FIG. 5 is a fragmentary section view taken along the line 5—5 of FIG. 4;

FIG. 6 is a transverse section view taken along the line 6—6 of FIG. 3; and

FIG. 7 is a fragmentary section view taken along the line 7—7 of FIG. 3, illustrating the mounting of the damper body on the pivot mounting arm therefor.

DETAILED DESCRIPTION OF A PREFERRED EMBODIMENT

Referring to the drawings, wherein like reference characters designate corresponding parts in the several figures, there is shown in FIG. 1 a typical attic installation of a high velocity ducted air type conditioning system having quick connecting attachment devices as described in our earlier patent application Ser. No. 874,472 entitled Quick Connect Air Duct Fittings, with which the shut off damper system of the present invention is designed to be used. The heating and cooling system may be described generally as comprising a heating and cooling generator 10 located in the attic space of the building and designed to discharge conditioned air from the generator directly into a main trunk duct 11 running above the ceiling in the attic of the building and having a plurality of smaller diameter branch ducts 12 extending therefrom to appropriate locations in the building to discharge the conditioned air at high velocity at ceiling level into the rooms of the building. The main trunk duct 11 forms the plenum for the system and may, for example, be formed of 7 inch internal diameter fiber glass tubing encased with aluminum or vinyl film such as by having a covering of aluminum sheet or vinyl film material forming a vapor barrier jacket on its exterior.

The branch ducts 12 are also well insulated to maintain properly the relatively high and low temperatures of the conditioned air circulated therethrough, and should be air tight and moisture proof to prevent leakage of the high and low temperature air and prevent moisture from accumulating in the insulation or on any surface of the ducts when cold air passes through the ducts. For example, the branch ducts 12 may each be approximately 2 inch inner diameter flexible tubing having a core, formed for example of a helix 12a of spring wire, covered by vinyl coated glass mesh 12d and insulating material 12b, preferably fiber glass wool of high density, and an outer covering of vinyl tubing 12c. Alternatively, a spiral metal tubing with perforations covered with insulation and a vinyl jacket may be used. This provides a branch duct whose outer diameter is sufficiently small, and which is sufficiently flexible, to facilitate conveniently running the branch ducts inside standard 2 x 4 stud partitions in residential building walls.

The branch ducts 12 are connected to an outlet fitting or terminator device 13, designed to discharge a smooth, unencumbered stream of air into the room to be served. For example, the outlet fitting 13 discharges the stream of conditioned air in a downward vertical direction at a velocity which will move the stream of air slightly less than the vertical height of the room with conservation of energy of the stream until it reaches a sufficient distance in the room to induce a moderate flow of substantially all the room air into intermingling relation with the conditioned air to achieve substantially uniform temperatures. In the type of branch duct system with which the present invention is concerned, the construction of the branch ducts 12 with the helical wire core 12a, the intermediate cylindrical tube 12b of fiber glass wool, and the outer vinyl jacket 12c, is such as to achieve sufficient sound attenuation to provide a quiet operating system wherein the noise levels are kept at low values acceptable to home owners, but without imposing excessive pressure drop or turbulence that would inhibit the circulation in the room in the desired manner. However, provision of a shut off damper immediately at the outlet fitting 13, to permit shutting off or reducing air flow from the outlet fitting, would create considerable noise at levels which would be unacceptable to the home owner. The present invention is concerned with the provision of the desired adjustable shut off of this air flow by a device in the form of an easily installed assembly that can be put into existing terminator outlets or be assembled at the time of installation, and wherein the damper portion is spaced a sufficient distance upstream from the discharge outlet to leave an adequate length of noise attenuating branch duct downstream of the damper to attenuate any noise contributions due to the damper.

The shut off damper assembly, which is indicated generally by the reference character 14, is designed to be inserted into the downstream or outlet end portion of the branch duct 12 and secured to one of the quick connect coupling members 15 provided at the downstream end of the branch duct, which corresponds to the construction disclosed in our earlier patent application Ser. No. 874,-472. This coupling member 15, which may be molded from plastic, has a somewhat frusto-conical inner annular neck portion 16 provided with interrupted spiral thread formations 16a on the exterior surface thereof designed to be inserted into and threadedly coupled with the helical wire core 12a of the branch duct 12. The larger diameter or outer end of the neck portion 16 integrally merges into a circular face plate portion 17 which projects outwardly from the neck portion 16. An outwardly spaced, substantially cylindrical flange portion 18 is integrally joined with the face plate portion 17 adjacent its outermost end and extends therefrom a short distance in the same direction as the neck portion 16 in co-axial relation with the axis of the neck portion. The flange portion 18 has outwardly extending bead formations 18a and 18b at the opposite edges thereof providing a slightly recessed cylindrical groove 18c in the exterior surface of the cylindrical flange portion 18. The face plate portions 17 have a pair of bayonet slots 19 at diametrically opposite portions thereof, each having an enlarged arcuate slot section 19a and a constricted slot section 19b, and each face plate portion 17 additionally includes a pair of bayonet type protrusions 20 along a diametrical axis extending perpendicular to the diametrical axis through the bayonet slots 19. The bayonet type protrusions 20 are each of right angular configuration defining an enlarged head portion 20a and a smaller cross-section stem portion 20b, the head portion 20a of each protrusion projecting inwardly from the stem portion towards the axis of the fitting to define a restraining shoulder having locking teeth 20a' thereon.

The annular recess 18c on the outer surface of the outer cylindrical flange portion 18 provides an area for the vinyl tubing jacket 12c to be held to the cylindrical flange portion 18 by an annular vinyl shrink band or a polypropylene band clamp, indicated generally at 21 secured by pliers to form an air tight seal. The band clamp 21 may be of the construction disclosed in our said earlier application Ser. No. 874,472, having a band portion 22 and a securing head 23.

In a typical installtation, there is connected to the coupling member 15 at the downstream end of the duct 12 an outlet fitting or terminator plate 13 of the construction illustrated in FIG. 2, which is also a molded plastic part. In the illustrated embodiment, this terminator plate has an annular face plate portion 26 surrounding an outwardly flaring circular bore 27 forming the discharge opening for the conduit. The face plate portion 26 has a cylindrical lip 26b at its outer perimeter adapted to abut against the surface of the wall or ceiling or floor of the room in the region surrounding the opening provided for the conditioned air discharged into the room, and the face plate also includes apertures 26a to permit screws or similar fastening means to extend therethrough into the wall, ceiling or floor for mounting the terminator plate on the building wall. The terminator plate 13 also has a pair of bayonet-like protrusions 28, each having a head portion 28a and a stem portion 28b corresponding substantially to the head and stem portions of the bayonet type protrusions 20, to be interfitted into the bayonet slots 19 of the coupling member 15 fixed to the adjacent end of the branch duct 12. Also, the terminator plate 13 has a circular groove 29 interrupted by the protrusions 28 and by a pair of slightly deeper wells 29a to accommodate the head portions of the bayonet type protrusions 20 on the adjacent coupling member 15 throughout the range of relative angular movement permitted by the bayonet slots 19 and the mating protrusions 28, so that the face plate 17 of the coupling member 15 can butt tightly against the confronting rear annular surface 30 of the terminator plate 13.

As illustrated in FIGS. 2, 4 and 5, a portion of the face plate 17 at one angular position adjoining the junction of the face plate with the cylindrical portion 16 is provided with a substantially rectangular shallow recess or well 31 having a short retaining post 32 of circular cross-section rising therefrom.

The shut off damper assembly, generally indicated by the reference character 14, comprises a damper body 36 in the form of a slightly elliptical plate 36a whose minor axis corresponds substantially to the inner diameter of the duct 12 and whose major axis is slightly greater than the duct inner diameter, to which is affixed a right angular plate 36b having a semi-circular portion extending perpendicular to the plate 36a. The plate 36b may include another semi-circular portion 36b' which is fixed flat against the plate 36a. A suitable elliptical gasket 37 is fixed to the face of the plate 36a opposite the plate 36b, by any suitable cement.

The damper body 36 is supported for pivotal movement about a horizontal transverse diametric axis of the duct, with the minor axis of the plate 36a aligned with said duct axis, by means of a pivot mounting arm 38 coupled at one end to the semi-circular plate portion 36b by rivet 39 and having a portion shaped into a substantially cylindrical formation 40 to be fixed on one end of a Bowden cable 41. The pivot mounting arm 38 may be formed with two parallel depending legs which flank the semi-circular plate portion 36b with the cylindrical formation 40 disposed in the middle of the member from which the mounting arm 38 is formed.

The length of the cable 41 will normally be in the vicinity of about 2 feet, and the outer or downstream end of the cable sheath 41a will have fixed thereto a clip assembly 42 for mounting the end of the cable on the coupling member 15 adjacent the outlet fitting 13. The clip assembly 42 is formed of a sheet metal strip and comprises a first planar body portion 43 flanked by downwardly converging flanges 44 defining a dovetail groove which slidably accommodates a slide member 45 for rectilinear reciprocative movement parallel to the axis of the coupling member 15. Extending from the inner end portion of the planar body portion 43 is a curved extension 46 having a pair of openings through which the end portion of the cable sheath 41a extends and terminating in a recurved tab or hook formation 47 adapted to hook about the inner end of the neck portion 16 of the coupling member 15. The curved extension 46 is preferably securely fastened to the end portion of the cable sheath 41a which extends therethrough by an epoxy adhesive or similar means as indicated at 46a.

At the opposite end of the planar body portion 43 is a right angle mounting flange 48 which is rounded, as illustrated, and has an aperture therein sized to be snapped onto the retaining post 32 in the well 31 on the face portion 17 of the coupling member 15. Thus, the recurved tab 47 hooking about the inner end of the neck portions 16, and the apertured flange 48 which is fitted over the retaining post 32 serve collectively to releasably mount the clip assembly 42 onto the coupling member 15. The slide 45 has a dovetail shaped portion slidably interfitting in the dovetail groove defined by the flanges 44, and has the perpendicular end portion 41b' of the inner wire 41b of the cable 31 fixed in the slide 45 so that manual movement of the slide 45 back and forth along the rectilinear path defined by the flanges 44 effects rotation of the damper body 36 about the axis of the pivot 39. The inner or upstream end of the cable wire 41b is secured to the semi-circular plate portion 36b by extending through a suitable hole in the plate portion 36b.

Thus the simple clip assembly permits the shut off damper unit to be quickly installed in the downstream end of the branch duct 12, when the outlet fitting 13 has been removed from the coupling member 15 on the downstream end of the branch duct. The installer simply inserts the damper body portion 36 through the opening defined by the neck portions 16 of the coupling member 15 and up through the bore or conduit defined by the branch duct 12 to the desired location about 2 feet upstream from the discharge end of the duct, whereupon the recurved tab 47 is hooked about an upstream end of the neck portion 16 and the mounting flange 48 is fastened to the retaining post 32 by fitting its aperture on the retaining post 32. If the duct portion through which the damper body must be inserted is curved or bent, the damper assembly can nevertheless be readily inserted by rotating the cable assembly as insertion progresses. The cable 41 is of sufficient length to position the damper body 36 and gasket 37 well upstream of the discharge orifice so that a length of the branch duct 12, which as previously described is sound attenuating tubing, is available downstream of the damper body 36 and gasket 37 to attenuate any noise contributions due to insertion of the damper.

Manual movement of the slide 45 outwardly or in a downstream direction to the broken line position, along the path defined by the flanges 44 acts through the intermediary of the cable 41 to adjust the damper respectively from open to closed position. The damper gasket 37 serves to help seal against the outrushing air stream in the sound attenuating tubing. In a fully closed position, it has been found that the shut off will be approximately 80% of full flow. The 20% air that continues to flow is due to bypass of air through the sound attenuating tubing forming the ducting, since the ducting is either a spiral wire backed by open glass mesh or spiral tubing with perforations whereby a positive 100% seal is not possible. By adjusting the position of the slide 45, it is possible to balance the amount of air flow emitting from the terminator orifice to the desired level. If desired, stops can be provided on the plate portion 36b which would be engaged by the pivot mounting arm 38 to prevent the damper from rotating to a fully open position, and serve to aid the installer in balancing of the system.

What is claimed is:

1. A shut off damper assembly capable of being installed as a unit into the end portion of an already installed flexible air tube of an air conditioning system through which high velocity conditioned air is conveyed to a space to be conditioned for discharge through an orifice device as an undiffused concentrated air stream projecting into the room, wherein the air tube is formed as a sound attenuating tubular sleeve of insulation material surrounding an interior cylindrical bore and terminating at its downstream end adjacent the orifice device with an annular integral connector having an axially elongated annular neck portion tightly fitted into the end of the air tube bore and a radially outwardly projecting annular face portion; the damper assembly comprising an elongated clip member having a pair of holding formations including a first formation to releasably hook about the upstream end of said neck portion and a second formation coactive with the first formation and spaced downstream therefrom to clamp a portion of the connector therebetween for removably supporting the assembly on the connector, a Bowden cable including an axially movable wire in an elongated sheath, a first end portion of the sheath being supported by said clip member and extending upstream through said bore, a damper-supporting arm structure carried by the opposite end portion of the sheath towards the center of the bore, a damper member including a plate portion shaped when occuping a selected angular position about a diametric transverse axis of the bore to close the bore to passage of air therethrough having a mounting portion extending perpendicularly from the plate portion, pivot means supporting the mounting portion on the arm structure for arcuate movement about a pivot axis paralleling the diametric transverse axis of the bore, means coupling a first end of the wire to the mounting portion of the damper member eccentrically of the pivot axis, and manually operable actuator means adjacent said clip member coupled to the opposite end of the wire for manual adjustment of the angular position of the damper plate portion between closing position and a range of spaced partially open positions.

2. A shut off damper assembly as defined in claim 1, wherein said clip member includes guide formations defining a rectilinear reciprocative guide path paralleling the bore axis at the downstream end of said neck portion, and said manually operable actuator means including a finger piece guided by said guide surfaces and secured to said opposite end of said wire for manual adjustment of the angular position of the damper plate portion.

3. A shut off damper assembly as defined in claim 2, wherein said second formation has an aperture and is disposed to overlap and bear against the face portion of said connector when the first formation is hooked about the upstream end of said neck portion, and said face portion of said connector having a recess therein defining a well for accommodating said second formation recessed in flush relation thereto and having a post formation projecting into said recess to interfit into the aperture in said second formation.

4. A shut off damper assembly as defined in claim 2, wherein said damper member is located a selected distance upstream from said connector providing an adequate length of said air tube of noise attenuating characteristics downstream of the damper member to attenuate any noise contributions to the air stream due to the damper.

5. A shut off damper assembly as defined in claim 1, wherein said clip member includes a pair of laterally spaced flanges defining a dovetail guideway opening toward and paralleling the axis of said neck portion, and said manually operable actuator means comprises a finger piece slide member having a portion complementary to the cross-section of said dovetail groove fitted therein for slidably guiding the finger piece along a rectilinear reciprocative path paralleling the axis of the neck portion of said connector, the finger piece slide member being secured to said opposite end of said wire for transmitting movement thereto.

6. A shut off damper assembly as defined in claim 5, wherein said second formation has an aperture and is disposed to overlap and bear against the face portion of said connector when the first formation is hooked about the upstream end of said neck portion, and said face portion of said connector having a recess therein defining a well for accommodating said second formation recessed in flush relation thereto and having a post formation projecting into said recess to interfit into the aperture in said second formation.

7. A shut off damper assembly as defined in claim 5, wherein said damper member is located a selected distance upstream from said connector providing an adequate length of said air tube of noise attenuating characteristics downstream of the damper member to attenuate any noise contributions to the air stream due to the damper.

8. A shut off damper assembly as defined in claim 5, wherein said clip member includes a first flat rectangular portion having said guide flanges along the lateral margins thereof, defining said guideway therebetween for said finger piece slide member, and said clip member also including a bowed extension projecting in an upstream direction from said flat portion, having a pair of apertures therethrough aligned along a rectilinear axis, said first end portion of said sheath extending through said aligned apertures in said bowed extension and being secured to said sheath at a location between said aligned apertures.

9. A shut off damper assembly as defined in claim 1, wherein said second formation has an aperture and is disposed to overlap and bear against the face portion of said connector when the first formation is hooked about the upstream end of said neck portion, and said face portion of said connector having a recess therein defining a well for accommodating said second formation in flush relation thereto and having a post formation projecting into said recess to interfit into the aperture in said second formation.

10. A shut off damper assembly as defined in claim 9, wherein said damper member is located a selected distance upstream from said connector providing an adequate length of said air tube of noise attenuating characteristics downstream of the damper member to attenuate any noise contributions to the air stream due to the damper.

11. A shut off damper assembly as defined in claim 1, wherein said damper member is located a selected distance upstream from said connector providing an adequate length of said air tube of noise attenuating characteristics downstream of the damper member to attenuate any noise contributions to the air stream due to the damper.

12. A shut off damper assembly as defined in claim 1, wherein said clip member includes a first flat rectangular portion having guide flanges along the lateral margins thereof defining a guideway therebetween for said actuator means, and said clip member also including a bowed extension projecting in an upstream direction from said flat portion, having a pair of apertures therethrough aligned along a rectilinear axis, said first end portion of said sheath extending through said aligned apertures in said bowed extension and being secured to said sheath at a location between said aligned apertures.

13. A shut off damper assembly capable of being installed as a unit into the end portion of a fluid conduit tube, the damper assembly comprising an elongated clip member having a hook-shaped formation and a longitudinally spaced shoulder formation adapted to clamp a tube portion therebetween for removably supporting the assembly in the tube, a Bowden cable including an axially movable wire in an elongated sheath, a first end portion of the sheath being supported by said clip member to extend in an upstream direction in the tube, a damper-supporting arm structure carried by the opposite end portion of the sheath and extending in angular relation thereto, a damper member including a generally elliptical plate portion to close the tube to fluid passage therethrough when disposed at a selected angle therein and having a mounting portion extending perpendicularly from the plate portion, pivot means supporting the mounting portion on the arm structure for arcuate movement about a pivot axis paralleling the diametric transverse axis of the sheath, means coupling a first end of the wire to the mounting portion of the damper member eccentrically of the pivot axis, and manually operable actuator means adjacent said clip member coupled to the opposite end of the wire for manual adjustment of the angular position of the damper plate portion between closing position and a range of spaced partially open positions.

14. A shut off damper assembly as defined in claim 13, wherein said clip member includes a pair of laterally spaced flanges defining a dovetail guideway opening toward and paralleling the longitudinal axis of the clip member, and said manually operable actuator means comprises a finger piece slide member having a portion complementary to the cross-section of said dovetail guideway fitted therein for slidably guiding the finger piece along a rectilinear reciprocative path paralleling said longitudinal axis, the finger piece slide member being secured to said opposite end of said wire for transmitting movement thereto.

15. A shut off damper assembly as defined in claim 14, wherein said clip member includes a first flat rectangular portion having said guide flanges along the lateral margins thereof, defining said guideway therebetween for said finger piece slide member, and said clip member also including a bowed extension projecting in an upstream direction from said flat portion, having a pair of apertures therethrough aligned along a rectilinear axis, said first end portion of said sheath extending through said aligned apertures in said bowed extension and being secured to said sheath at a location between said aligned apertures.

References Cited

UNITED STATES PATENTS

| | | | |
|---|---|---|---|
| 2,665,873 | 1/1954 | Backman et al. | 251—305 |
| 2,804,880 | 9/1957 | Rasmusson | 251—306UX |
| 3,507,354 | 4/1970 | Dieckmann et al. | 98—40X |

HENRY T. KLINKSIEK, Primary Examiner

U.S. Cl. X.R.

251—305; 98—40